United States Patent
Sato et al.

(10) Patent No.: US 9,103,979 B2
(45) Date of Patent: Aug. 11, 2015

(54) HOLDER ATTACHED MIRROR FOR VEHICLE

(71) Applicant: MURAKAMI CORPORATION, Shizuoka (JP)

(72) Inventors: Yosuke Sato, Shizuoka (JP); Kenji Iwasaki, Shizuoka (JP); Shigeki Takada, Shizuoka (JP)

(73) Assignee: MURAKAMI CORPORATION, Shizuoka (JP)

( * ) Notice: Subject to any disclaimer, the term of this patent is extended or adjusted under 35 U.S.C. 154(b) by 132 days.

(21) Appl. No.: 13/746,716

(22) Filed: Jan. 22, 2013

(65) Prior Publication Data

US 2013/0208374 A1    Aug. 15, 2013

(30) Foreign Application Priority Data

Feb. 10, 2012  (JP) ................................ 2012-027678

(51) Int. Cl.
*G02B 5/08* (2006.01)
*G02B 7/182* (2006.01)
*B60R 1/06* (2006.01)

(52) U.S. Cl.
CPC .. *G02B 7/182* (2013.01); *B60R 1/06* (2013.01)

(58) Field of Classification Search
CPC ............ B60R 1/02; B60R 1/06; B60R 1/066; B60R 1/072

USPC .......................................... 359/841, 872, 877
See application file for complete search history.

(56) References Cited

U.S. PATENT DOCUMENTS

| 6,109,586 A * | 8/2000 | Hoek ............................. 359/871 |
| 6,773,124 B2 * | 8/2004 | Marusawa et al. ............ 359/872 |
| 7,055,974 B1 | 6/2006 | Matsuura et al. |
| 2006/0132944 A1 | 6/2006 | Matsuura et al. |

FOREIGN PATENT DOCUMENTS

| JP | 58-105845 | 6/1983 |
| JP | H7-040287 | 7/1995 |
| JP | 2003-002117 | 1/2003 |
| JP | 2006-168648 | 6/2006 |
| JP | 2010-013592 | 1/2010 |

OTHER PUBLICATIONS

Japan Office action, dated May 19, 2015, along with an English translation thereof.

* cited by examiner

*Primary Examiner* — Euncha Cherry
(74) *Attorney, Agent, or Firm* — Greenblum & Bernstein, P.L.C.

(57) ABSTRACT

A holder attached mirror for a vehicle is provided, in which a mirror plate is fixed to a plate-shaped mirror holder by an adhesive sheet, including a plurality of first grooves parallel to each other, which are formed on the surface of the mirror holder attached with the adhesive sheet on the surface of the mirror holder side to which the adhesive sheet is attached.

16 Claims, 7 Drawing Sheets

HOLDER ATTACHED MIRROR FOR VEHICLE

CROSS-REFERENCE TO RELATED APPLICATIONS

This application is based upon and claims the benefit of priority from Japanese Patent Application No. 2012-027678, filed Feb. 10, 2012, the entire contents of which are incorporated herein by reference.

TECHNICAL FIELD

The present invention relates to a holder attached mirror for a vehicle, which uses an adhesive sheet by considering assembly workability.

BACKGROUND

In the related art, a technology in this field is disclosed in Japanese Patent Application Laid-Open No. 2010-13592. A mirror holder of a holder attached mirror disclosed in the Japanese Patent Application Laid-Open No. 2010-13592 is made of a resin. An edge portion having a height corresponding to the thickness of a mirror plate is provided in the mirror holder. A claw piece that protrudes inside is formed at a free end of the edge portion. The mirror plate is fixed to the mirror holder by an adhesive tape. A peripheral edge of the mirror plate is pushed on the mirror holder by the claw piece. Accordingly, the mirror plate can be prevented from being separated from the mirror holder by coordination of the claw piece and the adhesive tape. Further, a mirror holder that does not adopt the claw piece is also present in order to achieve thinness and lightness. In this case, holding performance of the mirror plate is increased by increasing bonding force of the adhesive tape.

SUMMARY

However, in the aforementioned holder attached mirror in the related art, a variation occurs in a gap size between a back surface of the mirror plate and the surface of the mirror holder due to a variation in the mirror holder in manufacturing. As a result, a variation in a bonding strength occurs on a bonding surface of the adhesive tape interposed between the back surface of the mirror plate and the surface of the mirror holder. Deterioration in the bonding strength is caused by the variation in the bonding strength. Therefore, the holding performance of the mirror plate deteriorates.

The present invention is directed to provide a holder attached mirror for a vehicle that can improve the holding performance of a mirror plate.

According to an aspect of the present invention, there is provided a holder attached mirror for a vehicle in which a mirror plate is fixed to a plate-shaped mirror holder by an adhesive sheet, including a plurality of first grooves parallel to each other, which are formed on the surface of the mirror holder side to which the adhesive sheet is attached.

In a mirror used in the vehicle, a mirror plate is fixed to a plate-shaped mirror holder, and as a result, it is difficult that chatter vibration by vibration when the vehicle is driven occurs. However, when the mirror is used under a situation in which the mirror is exposed to vibration or rain and wind, the mirror plate is easily peeled off from the mirror holder. This situation needs to be avoided as possible. In the holder attached mirror for a vehicle according to the aspect of the present invention, the first groove is formed in the mirror holder. Therefore, when the mirror holder is manufactured, even though a variation occurs, the mirror holder side is easily followed to a mirror plate and deformed. As a result, it is difficult that a variation in a bonding strength of an adhesive sheet occurs, which is interposed between a back surface of the mirror plate and the surface of the mirror holder. As a result, holding performance of the mirror plate by the mirror holder is improved. Further, when the adhesive sheet adheres to the mirror holder, the first grooves may be used as a passage through which air escapes, and thus it is difficult that air is gathered between the adhesive sheet and the mirror holder and the bonding strength may be prevented from deteriorating due to the air gathering. When the first grooves are arranged in parallel to each other, particularly in the case where a back surface of the mirror plate is a flat surface, the mirror holder may be particularly efficiently followed and deformed.

At least one groove of the first grooves communicates with an opening formed at the center of the mirror holder. When this configuration is adopted, air which causes the bonding strength to deteriorate is circulated toward the opening to thereby significantly discharge air to the outside.

The first grooves are arranged at a regular interval. According to this configuration, the mirror holder may be evenly deformed throughout an entire surface thereof.

Second grooves on the back surface side of the mirror holder are formed in parallel to the first grooves between the first grooves which are adjacent to each other. When this configuration is adopted, the second groove may complement deformation in the mirror holder by the first groove. Further, when the first groove and the second groove are formed at the same position in the front and rear of the mirror holder, in the case where the mirror holder is molded by using an injection molding machine, a sprue runner is extremely narrowed between the first groove and the second groove, and as a result, there is a concern that a molding defect will occur. The second groove is formed between the first grooves which are adjacent to each other, and as a result, the sprue runner is not narrowed beyond necessity.

According to the present invention, the holding performance of the mirror plate can be improved.

BRIEF DESCRIPTION OF THE DRAWINGS

FIG. 6A is a perspective view and FIG. 6B is a cross-sectional view.

DETAILED DESCRIPTION

Hereinafter, embodiments of a holder attached mirror for a vehicle according to the present invention will be described in detail with reference to the accompanying drawings.

A door mirror for a vehicle is fixed to an exterior of a front door panel through an arm portion by a screw, and the like. The door mirror includes a door mirror body made of a resin, which has a bowl shape in order to store a motor, and the like therein. The door mirror body includes a casing having an opening which is opened toward a rear side of the vehicle and a cup-shaped divider fixed with fitting in the opening of the casing.

Figure 2:
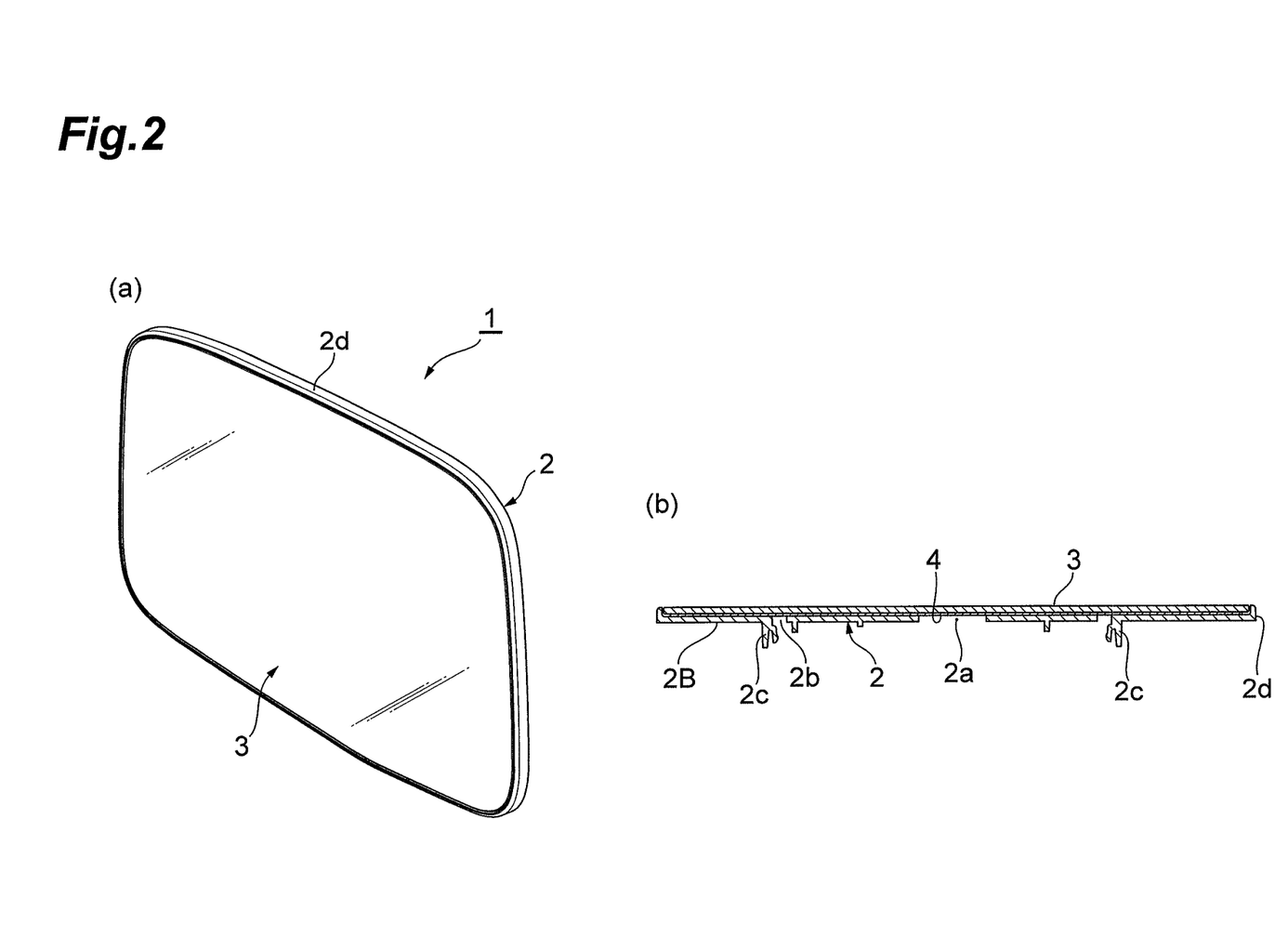
FIG. 2A is a perspective view of the holder attached mirror for a vehicle and FIG. 2B is a cross-sectional view of the holder attached mirror for a vehicle.

A concave portion is installed in the divider. The concave portion is opened toward the rear of the vehicle. A holder attached mirror 1 (see FIG. 2) is disposed in the concave portion. The holder attached mirror 1 is removably mounted on a pivot plate of which an inclination angle is adjustable in order to change to a predetermined mirror surface angle.

Figure 1:
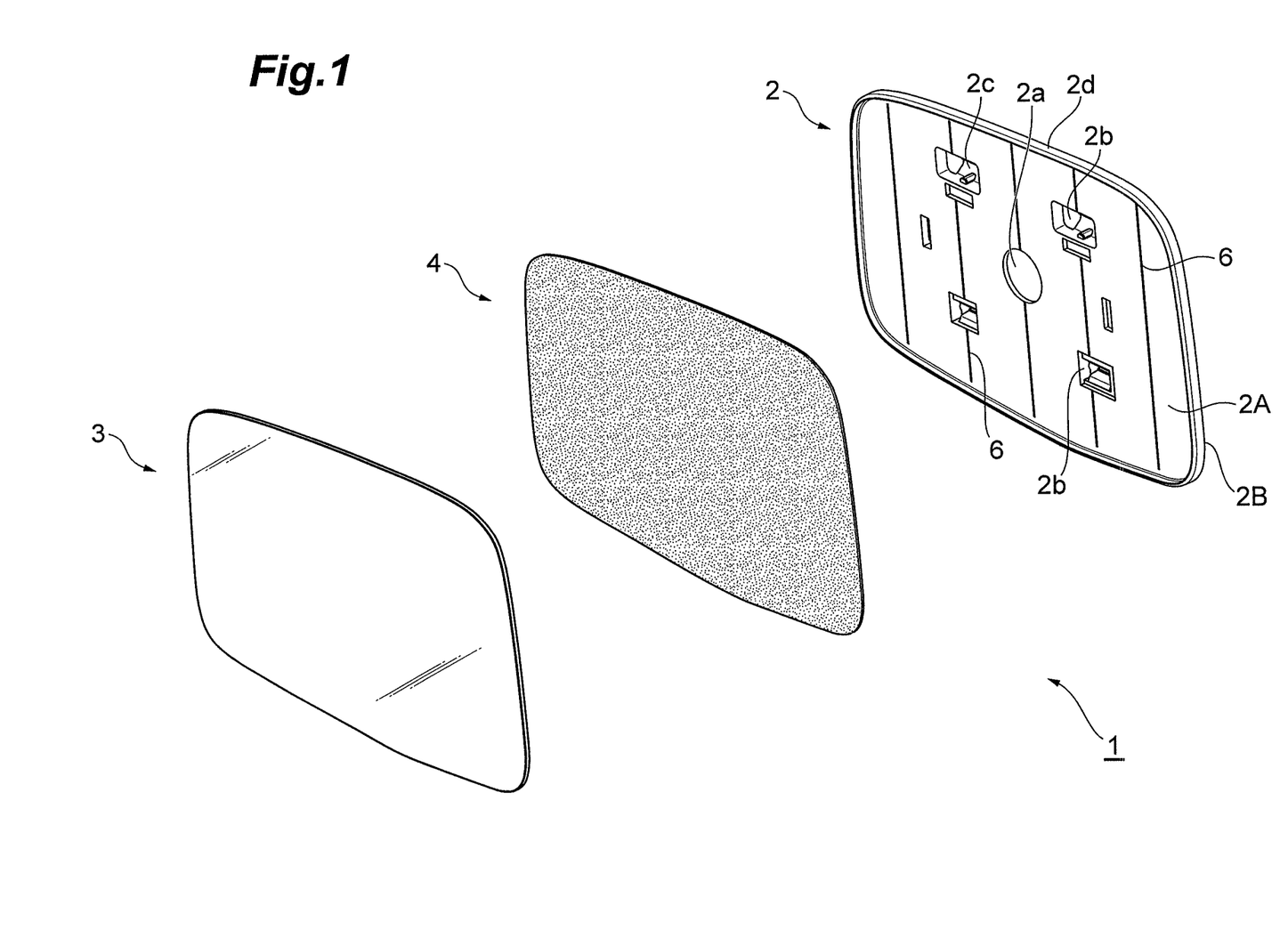
FIG. 1 is an exploded perspective view of a holder attached mirror for a vehicle according to a first embodiment of the present invention.

As illustrated in FIGS. 1 and 2, the holder attached mirror 1 includes a rectangular plate-shaped mirror holder 2 made of a resin (for example, acrylonitrile.styrene.acrylic rubber (ASA), polypropylene (PP), or acrylonitrile.butadiene rubber.styrene (ABS)). An opening 2a having a diameter of approximately 20 mm is formed at the center of the mirror holder 2, and a plurality of (for example, eight) rectangular openings 2b is formed around the opening 2a. A claw piece 2c for making the mirror holder 2 be removable from the pivot plate is integrally molded on a back surface 2B of the mirror holder 2. The claw piece 2c is molded to be viewed from each opening 2b.

Further, an edge portion 2d disposed to surround a peripheral edge of a mirror plate 3 is vertically arranged on a peripheral edge of the mirror holder 2. The mirror plate 3 is formed as a convex mirror acquired by vapor-depositing a plated layer on glass. Since a back surface of the mirror plate 3 is formed as a concave surface, an adhesive sheet 4 is used to fix the mirror plate 3 onto the surface of the mirror holder 2 by considering workability. An adhesive material is applied to both surfaces of the adhesive sheet 4. The adhesive sheet 4 has a cushion property by considering a manufacturing error of the mirror holder 2.

Figure 3:
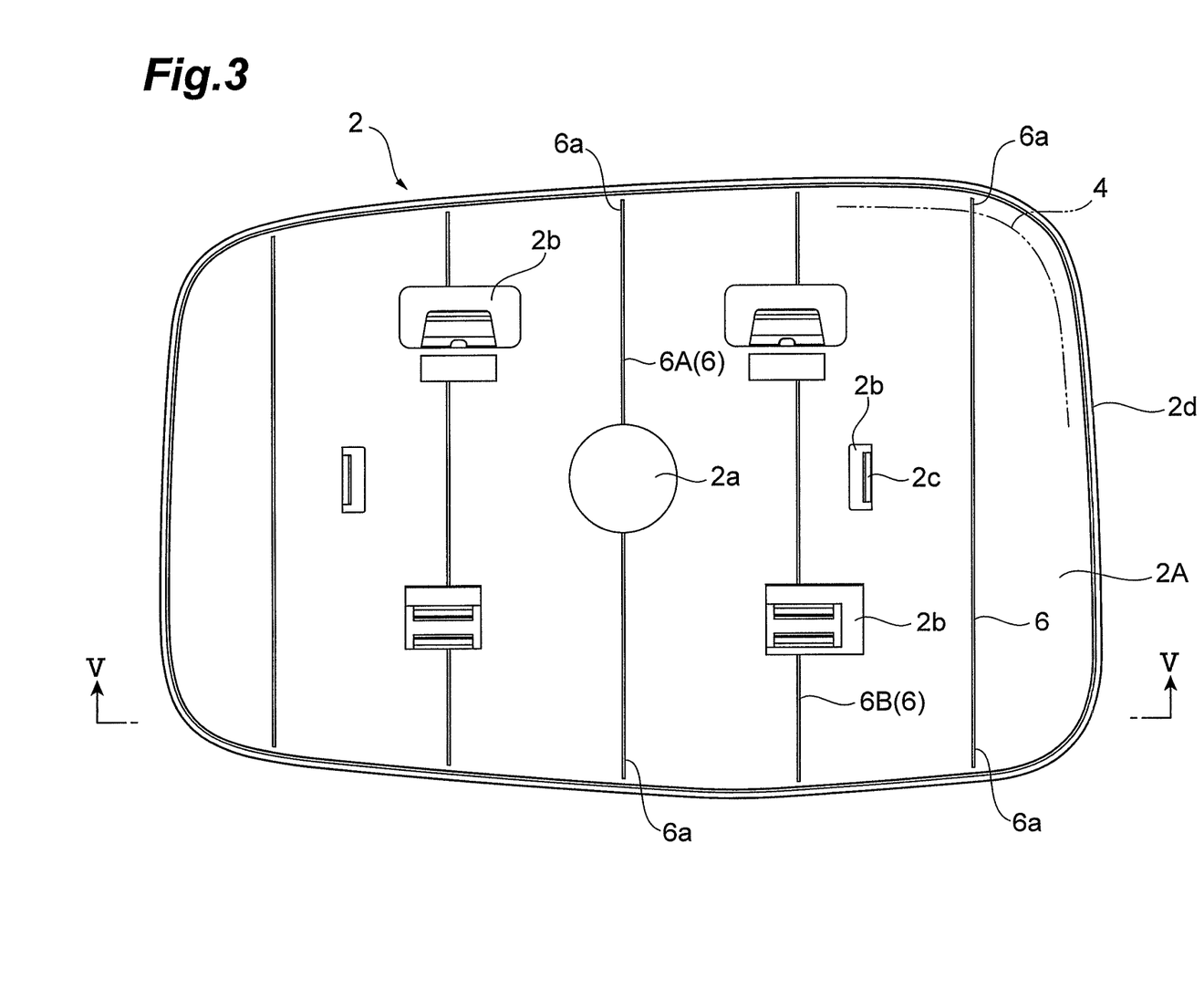
FIG. 3 is a front view of a mirror holder.
Figure 5:
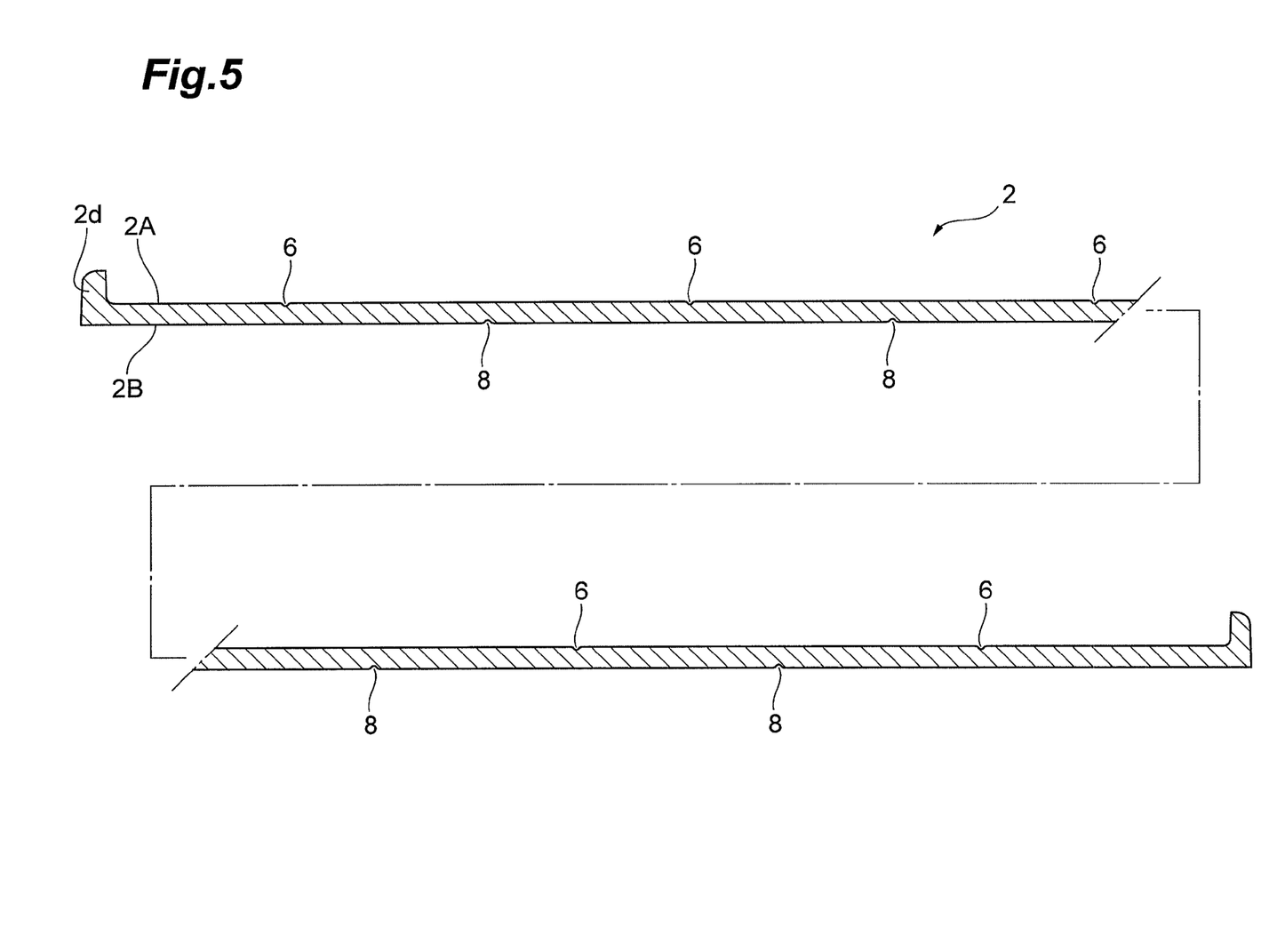
FIG. 5 is a cross-sectional view taken along line V-V of FIG. 3.

However, by considering the manufacturing error of the mirror holder 2, when the adhesive sheet 4 is made thick, the thickness of the mirror 1 itself is increased, and as a result, the mirror 1 may not be thin. Therefore, as illustrated in FIGS. 3 and 5, a plurality of first grooves 6 which extend in a vertically direction and are parallel to each other is formed at a regular interval on a surface 2A of the mirror holder 2 which is horizontally long. In the mirror holder 2, when a size (thickness) between the surface 2A and the back surface 2B is approximately 2 mm, the width of the first groove 6 having a V-shaped or U-shaped cross section is approximately 0.4 mm and the depth thereof is approximately 0.3 mm.

In a general mirror, a mirror plate is fixed to a plate-shaped mirror holder, and as a result, it is difficult that chatter vibration by vibration when the vehicle is driven occurs. However, when the mirror is used under a situation in which the mirror is exposed to vibration or rain and wind, the mirror plate is easily peeled off from the mirror holder. This situation needs to be avoided as possible.

Figure 6:
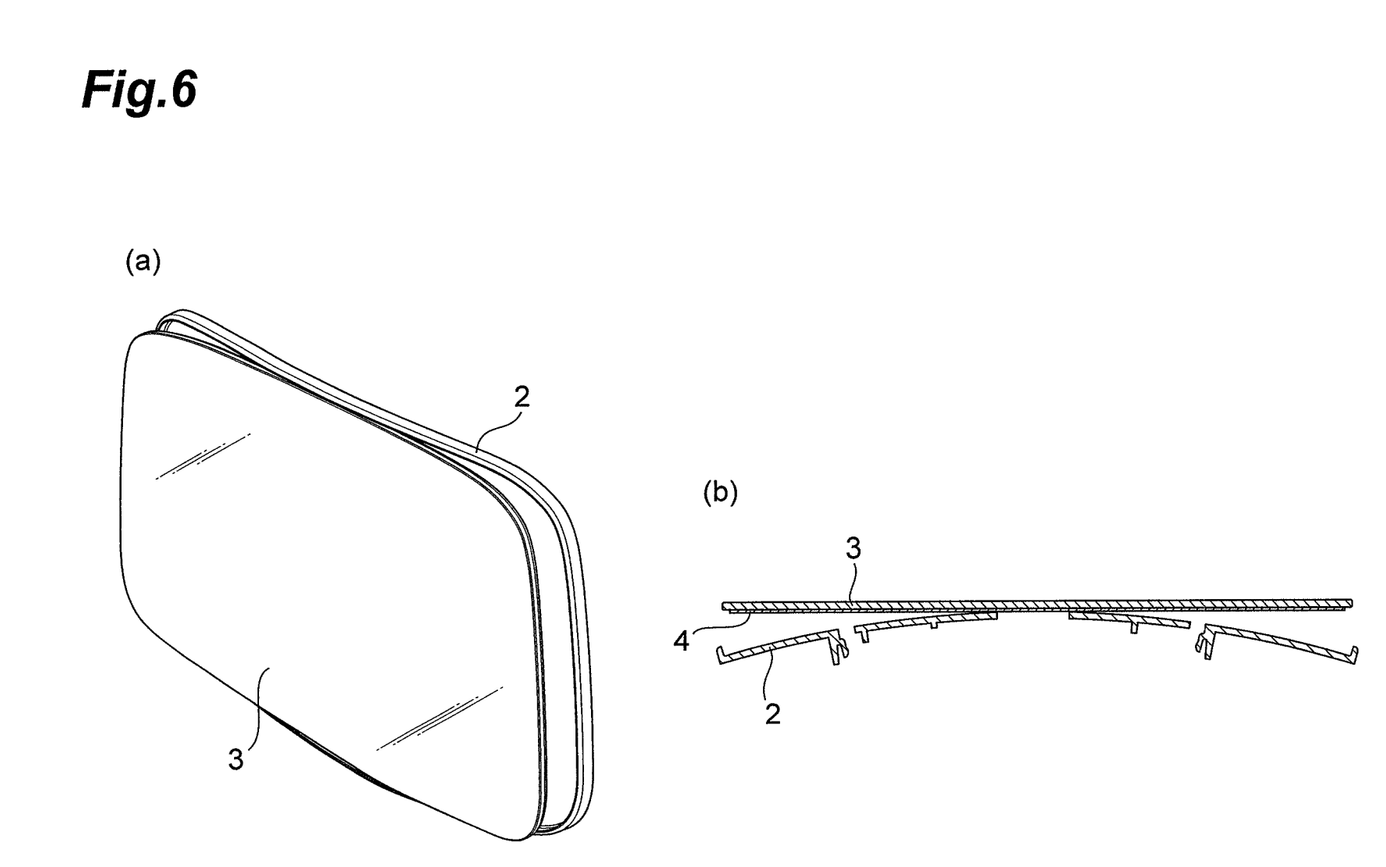
FIG. 6 illustrates a state before the mirror holder is fixed to the mirror plate.
Figure 7:
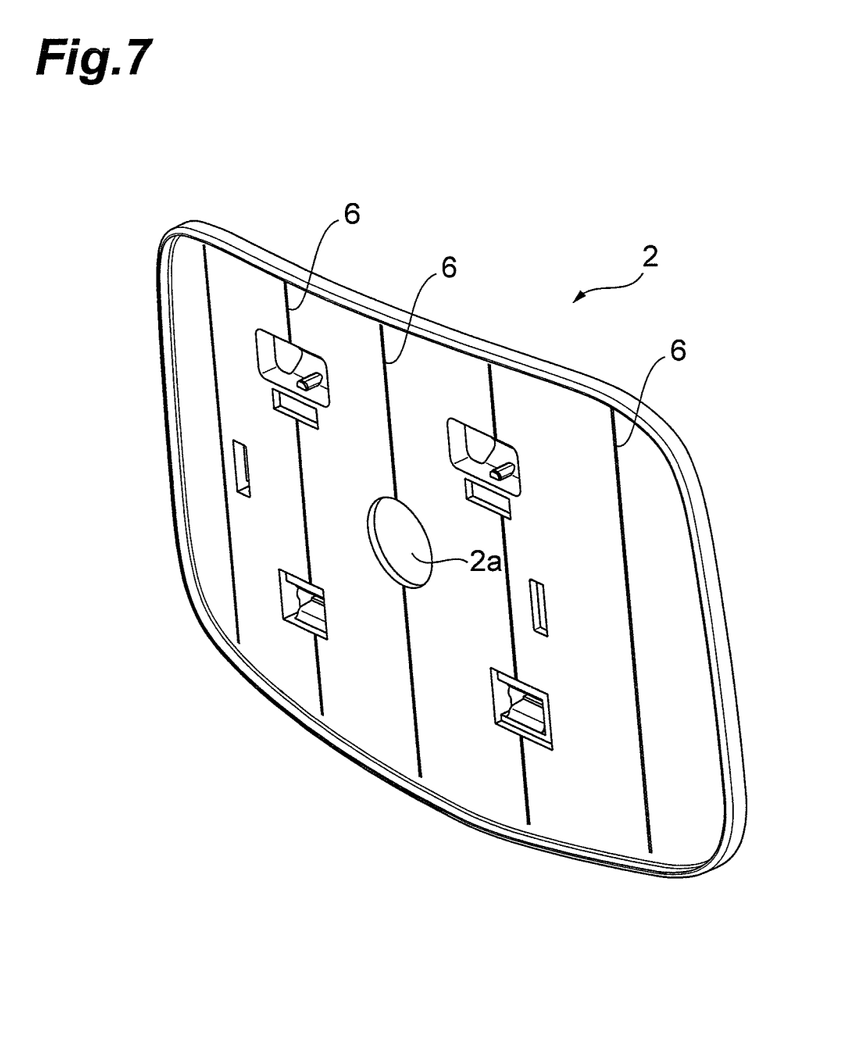
FIG. 7 is a perspective view of the mirror holder illustrated in FIG. 6.

Therefore, in the aforementioned holder attached mirror 1 for a vehicle, the first parallel grooves 6 are formed in the mirror holder 2. Accordingly, for example, as illustrated in FIGS. 6 and 7, even when the mirror plate 3 is manufactured with being largely curved so that the center of the mirror holder 2 is inflated or large variation occurs in the mirror holder 2 by contraction of the resin while manufacturing, the mirror holder 2 side is easily followed to the mirror plate 3 and deformed. As a result, it is difficult that a variation in a bonding strength of an adhesive sheet 4 occurs, which is interposed between a back surface of the mirror plate 3 and the surface 2A of the mirror holder 3. As a result, holding performance of the mirror plate 3 by the mirror holder 2 may be improved.

Further, when the adhesive sheet 4 adheres to the mirror holder 2, the first groove 6 may be used as a passage through which air escapes, and thus it is difficult that air is gathered between the adhesive sheet 4 and the mirror holder 2 and the bonding strength may be prevented from deteriorating due to gathering of air. When the first grooves 6 are arranged in parallel, particularly, in the case where the back surface of the mirror plate 3 is a flat surface, the mirror holder 2 may be efficiently followed and deformed.

Since the first grooves 6 are arranged at a regular interval, the mirror holder 2 may be evenly deformed throughout an entire surface thereof.

Both ends 6a of each first groove 6 are positioned in the vicinity of the edge portion 2d, and the both ends 6a are opened with the adhesive sheet 4 attached to the mirror holder 2 without being clogged by the adhesive sheet 4 in the vicinity of the edge portion 2d (see a two-dot chain line in FIG. 3). As a result, the first groove 6 efficiently serves as the passage through which air escapes when the adhesive sheet 4 is attached to the mirror holder 2. The air gathering which causes the bonding strength to deteriorate is prevented from being generated.

A first groove 6A at the center among the plurality of first grooves 6 extends to pass through the opening 2a. A first groove 6B among the plurality of first grooves 6 extends to pass through the opening 2b formed to correspond to the claw piece 2c. That is, the first groove 6A communicates with the opening 2a. The first groove 6B communicates with the opening 2b. Therefore, when the adhesive sheet 4 is attached to the mirror holder 2, air which passes through the first grooves 6A and 6B may be let out from the openings 2a and 2b. The air gathering which causes the bonding strength to deteriorate is prevented from being generated.

Figure 4:
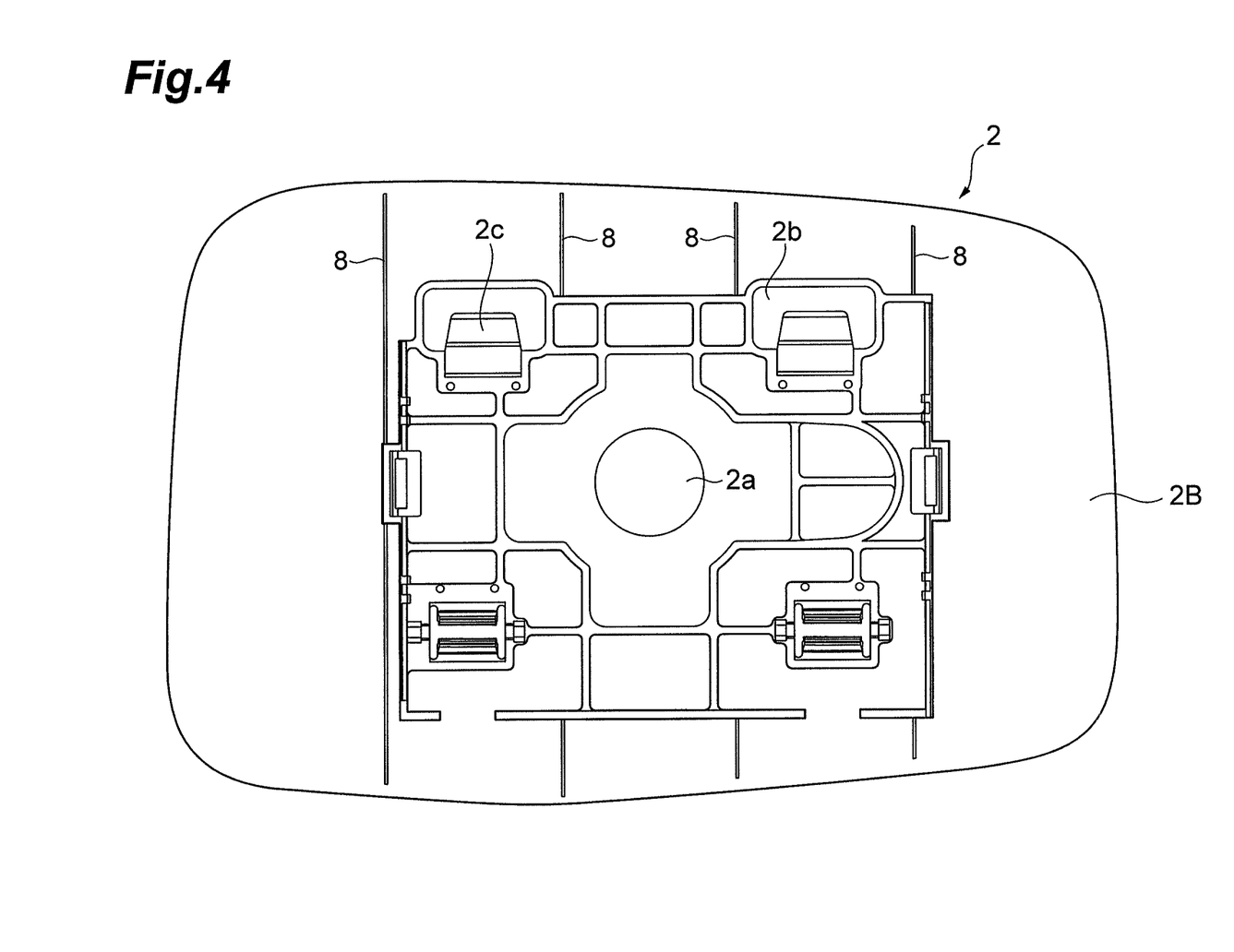
FIG. 4 is a rear view of the mirror holder.

As illustrated in FIGS. 4 and 5, a second groove 8 on the back surface 2B side of the mirror holder 2 is positioned to correspond between the first grooves 6 and 6 which are adjacent to each other on the surface 2A side, and formed in parallel to the first grooves 6 and 6. When this configuration is adopted, the second groove 8 may complement deformation in the mirror holder 2 by the first groove 6. In the front and rear of the mirror holder 2, when the first groove 6 and the second groove 8 are formed at the same position, in the case where the mirror holder 2 is molded by using an injection molding machine, a sprue runner is extremely narrowed between the first groove 6 and the second groove 8, and as a result, there is a concern that a molding defect will occur. The second groove 8 is formed between the first grooves 6 and 6 which are adjacent to each other, and as a result, the sprue runner is not narrowed beyond necessity.

The second groove 8 may be positioned in the middle of the first grooves 6 and 6 which are adjacent to each other to efficiently complement the deformation in the mirror holder 2 by the first groove 6.

The present invention is not limited to the aforementioned embodiment.

For example, an air circulation groove (not illustrated) for connecting the first grooves 6 and 6 which are adjacent to each other may be formed on the surface 2A of the mirror holder 2. The air circulation groove extends perpendicular to the first groove 6 by passing through the openings 2a and 2b, and communicates with the openings 2a and 2b. When this configuration is adopted, the air gathering between the first grooves 6 which are adjacent to each other is prevented by the air circulation groove to thereby significantly prevent the bonding strength from deteriorating. Further, air may be circulated toward the openings 2a and 2b to significantly discharge air to the outside. The air circulation groove may have the same width and depth as the width and the depth of the first groove 6.

What is claimed is:

1. A holder attached mirror for a vehicle in which a mirror plate is fixed to a plate-shaped mirror holder by an adhesive sheet, the mirror holder comprising a plurality of first grooves parallel to each other, the first grooves provided on a first surface of the mirror holder to which the adhesive sheet is attached, wherein at least one groove of the first grooves intersects with an opening provided at a center of the mirror holder.

2. The holder attached mirror for a vehicle according to claim 1, wherein the first grooves are arranged at a regular interval.

3. The holder attached mirror for a vehicle according to claim 1, wherein second grooves on a second surface of the mirror holder are provided parallel to the first grooves and between the first grooves which are adjacent to each other.

4. The holder attached mirror for a vehicle according to claim 3, wherein the second grooves are positioned in the middle of the first grooves which are adjacent to each other.

5. The holder attached mirror for a vehicle according to claim 1, wherein both ends of at least one groove of the first grooves are positioned in the vicinity of an edge portion of the mirror holder and the both ends extend beyond an edge of the adhesive sheet.

6. The holder attached mirror for a vehicle according to claim 1, wherein at least one groove of the first grooves intersects with an opening that correspond to a claw piece of the mirror holder.

7. The holder attached mirror for a vehicle according to claim 1, wherein the first grooves are parallel in a lengthwise direction with respect to one another.

8. A holder attached mirror for a vehicle in which a mirror plate is fixed to a plate-shaped mirror holder by an adhesive, the mirror holder comprising a plurality of first grooves parallel to each other, which are provided on a first surface of the mirror holder to which the adhesive is attached, wherein both ends of at least one groove of the first grooves are positioned in the vicinity of an edge portion of the mirror holder and the both ends extend beyond an edge of the adhesive.

9. The holder attached mirror for a vehicle according to claim 8, wherein at least one groove of the first grooves intersects with an opening provided centrally of the mirror holder.

10. The holder attached mirror for a vehicle according to claim 8, wherein the first grooves are arranged at a regular interval.

11. The holder attached mirror for a vehicle according to claim 8, wherein second grooves on a second surface of the mirror holder are provided parallel to the first grooves between adjacent ones of the first grooves.

12. The holder attached mirror for a vehicle according to claim 11, wherein the second grooves are positioned in the middle of the adjacent ones of the first grooves.

13. The holder attached mirror for a vehicle according to claim 8, wherein at least one groove of the first grooves intersects with an opening that corresponds to a claw piece of the mirror holder.

14. The holder attached mirror for a vehicle according to claim 1, wherein the first grooves are parallel in a lengthwise direction with respect to one another.

15. A holder attached mirror for a vehicle in which a mirror plate is fixed to a plate-shaped mirror holder by an adhesive, the mirror holder comprising a plurality of first grooves parallel to each other, which are provided on a first surface of the mirror holder to which the adhesive is attached, wherein second grooves on a second surface of the mirror holder are provided parallel to the first grooves between adjacent ones of the first grooves.

16. The holder attached mirror for a vehicle according to claim 15, wherein the second grooves are positioned in the middle of the first grooves which are adjacent to each other.

* * * * *